United States Patent
Duerk et al.

(10) Patent No.: US 7,315,737 B2
(45) Date of Patent: Jan. 1, 2008

(54) SWITCHING TO VOICE MAIL IN THE EVENT OF A DROPPED CALL

(75) Inventors: Paul Brian Duerk, Kenvil, NJ (US); Allen J. Rooney, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 787 days.

(21) Appl. No.: 10/047,040

(22) Filed: Jan. 14, 2002

(65) Prior Publication Data
US 2003/0134617 A1 Jul. 17, 2003

(51) Int. Cl.
*H04M 11/10* (2006.01)

(52) U.S. Cl. .................. 455/413; 455/423; 455/445

(58) Field of Classification Search ............ 455/417, 455/560, 561, 413, 415, 461, 423, 421, 436, 455/445
See application file for complete search history.

(56) References Cited

U.S. PATENT DOCUMENTS 5,995,830 A * 11/1999 Amin et al. ............... 455/423
6,311,057 B1 * 10/2001 Barvesten ................. 455/415
6,418,307 B1 * 7/2002 Amin ....................... 455/413
6,584,316 B1 * 6/2003 Akhteruzzaman et al. .. 455/445

* cited by examiner

*Primary Examiner*—Gerald Gauthier

(57) ABSTRACT

A method and apparatus for enabling a party using a telephony device who is in communication with a mobile device of a wireless network user to leave a voice mail for the mobile device user in the event that the user's mobile device is dropped during a call between said party and said mobile device user. Voice message processing circuitry in communication with cell equipment of a wireless network determines whether the user's mobile device has been dropped during a call between the mobile device user and another party. If a determination that the user's mobile device has been dropped during the call, the other party's telephony device is automatically connected to a voice mail system associated with the dropped mobile device user so that the party can leave a voice mail message for the dropped mobile device user.

9 Claims, 6 Drawing Sheets

SWITCHING TO VOICE MAIL IN THE EVENT OF A DROPPED CALL

TECHNICAL FILED OF THE INVENTION

The present invention relates to wireless communications and, more particularly, to providing a party who is having a telephone conversation with a mobile device user with an opportunity to leave a voice mail message for the mobile device user in the event that the mobile device user loses communication with the cellular network during the call.

BACKGROUND OF THE INVENTION

Wireless networks allow users to use mobile devices, such as cellular telephones and personal digital assistants (PDAs), for example, to communicate over a wireless link with cells, also commonly referred to as base stations. Each cell is in communication with a mobile switching center (MSC) via a wired link, such as a T1 line, for example, or via a wireless link, such as a microwave frequency link, for example. The mobile devices communicate with the cell, which, in turn, communicates with the MSC. The MSC establishes the communication link between the mobile user and the party that called the mobile user, or the party that was called by the mobile user.

Each MSC has a database known as a home location register (HLR) and a database known as visitor location register (VLR). The HLR is the main database of permanent subscriber information for a mobile network. The HLR is maintained by the subscriber's home carrier (or the network operator where the user initiated the call) and contains user information such as the user's residence address, account status, and certain preferences. The HLR interacts with the MSC, which performs the switching functions needed for call control and processing. The MSC also serves as a point-of-access to the Public Switched Telephone Network (PSTN). The VLR maintains temporary user information, such as the user's current location, to manage requests from subscribers who are out of the area covered by their home system.

When a mobile user initiates a call, a cell in the area where the call was initiated contacts the MSC with which the cell communicates. The MSC switching equipment then determines whether or not the call is coming from the mobile device's home area. If the user is out of the home area, the area VLR causes the MSC handling the call to send out a request for information required to process the call. The MSC handling the call analyzes the HLR identified by the call, and then relays to the appropriate MSC, which in turn updates the home VLR. The home MSC then sends routing information back to the MSC handling the call, which allows it to find the cell where the call originated, and ultimately, the mobile device that initiated the call.

In order to find the mobile device, the MSC sends out a paging request to sets of cells that are in communication with the MSC. Because there are typically a large number of cells associated with each MSC, the MSC attempts to locate the mobile device by sending out paging signals. Once the MSC locates the cell serving the mobile device, the location of the mobile device is updated in the HLR of the home MSC. If the mobile device is not in the home area, a record is also created in the VLR of the out-of-area MSC to enable the roaming mobile device to be served by the out-of-area MSC.

Notwithstanding the vast deployment of cells and MSCs, for various reasons, calls continue to be dropped. This can occur for a variety of reasons, such as, for example, a mobile device user may move to a location that is out of range of any cell, the mobile device may be transmitting at too low of a power level, a physical barrier (e.g., a traffic tunnel) may exist between the mobile device user and the cell that absorbs the signal of the cell and/or of the mobile device, etc. When a call is dropped, although the MSC that is enabling the communication between the parties, neither the called nor the calling party is provided with closure of the conversation. Typically, one of the parties will later attempt to contact the other party to finish the conversation. The party who was not dropped during the call, remains in contact with the network. If the party who was not dropped were provided with the opportunity to leave a voice mail message for the dropped party, there would be closure to the conversation.

Accordingly, a need exists for a cellular network feature that would enable a party to leave a voice mail message for a mobile device user in the event that the mobile device user is dropped during a call.

SUMMARY OF THE INVENTION

In accordance with the present invention, a method and apparatus are provided for enabling a party using a telephony device who is in communication with a mobile device of a wireless network user to leave a voice mail for the mobile device user in the event that the user's mobile device is dropped during a call between said party and said mobile device user. Voice message processing circuitry in communication with, or comprised within, a wireless network determines whether the user's mobile device has been dropped during a call between the mobile device user and another party. If the voice message processing circuitry determines that the user's mobile device has been dropped during the call, it automatically causes the other party's telephony device to be connected to a voice mail system associated with the dropped mobile device user so that the party can leave a voice message for the dropped mobile device user.

The voice message processing circuitry may be at any location that is in communication with, or comprised within, the wireless network. Also, the voice message processing circuitry need not be comprised at a single location. A portion of the processing circuitry needed for performing the tasks may be at one location in or in communication with the wireless network and one or more other portions of the processing circuitry may be at one or more locations in the network or in communication with the network. For example, the voice message processing circuitry may be comprised at an MSC and/or at a base station controller and/or at a base station and/or at an authentication center within, or in communication with, the wireless network.

These and other features and embodiments of the present invention will be described below with reference to the detailed description, drawings and claims.

BRIEF DESCRIPTION OF THE DRAWINGS

FIG. 3 is a diagram illustrating a single cell that is in communication with an an MSC, which is in communication with a voice mail system of an out-of-range mobile device user.

DETAILED DESCRIPTION OF THE INVENTION

FIGS. 1A, 1B, 2 and 3 are diagrams illustrating example situations in which the present invention may be implemented to enable a voice message to be left for a mobile device user in the event that the mobile device user is dropped during a telephone conversation. In the context of the present invention, the term "dropped" is intended to denote a mobile device user losing the communication link with a wireless network. As discussed above, a mobile device user can lose the communication link with the wireless network for a variety of reasons, such as, for example, being out of range of any cell of the network, the mobile device transmitting at too low of a power level, a physical barrier between the mobile device user and the network that absorbs or reflects the signal of the cell and/or of the mobile device. In accordance with the present invention, when the mobile device user is dropped for some reason, the other party to the telephone call is provided the opportunity to leave a voice message for the dropped mobile device user. The manner in which this can be accomplished is discussed below in more detail with reference to FIGS. 4 and 5.

Figure 1A:
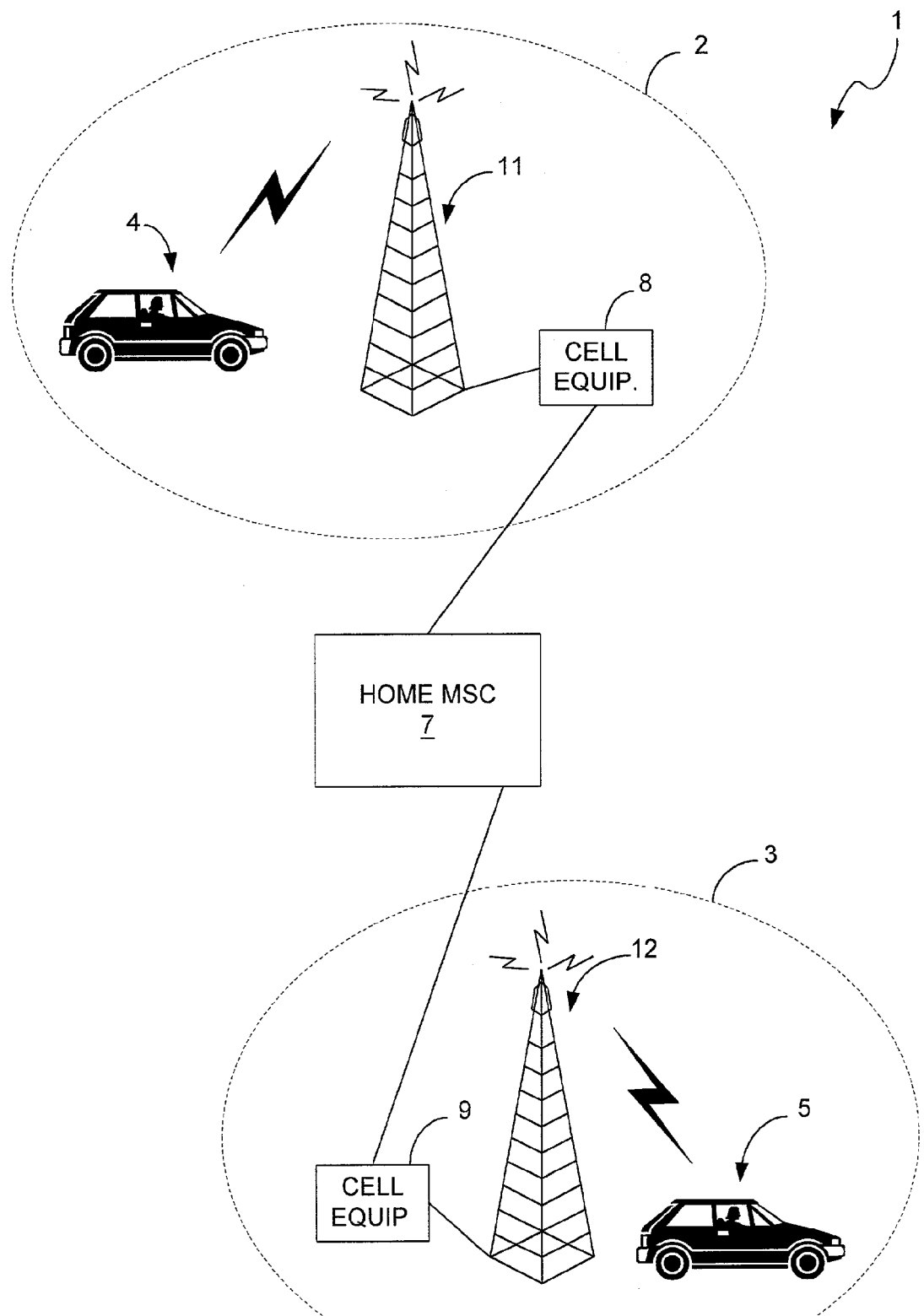
FIG. 1A illustrates a wireless network having two cells that are connected to the same home MSC, and two mobile device users that are in contact with each other via the wireless link between the mobile devices and their respective cells and the wired link between the cells and the MSC.

FIG. 1A is a diagram illustrating a wireless network 1 having two cells 2 and 3 that are served by and are in communication with the same home MSC 7. In this case, the parties participating in a telephone conversation are both using mobile devices from their automobiles 4 and 5, as indicated by their locations within the boundaries of the cells 2 and 3, which are represented by dashed circles. The home MSC 7 uses information contained in the home HLR to provide call setup for the parties and to maintain communication between the parties while they are within the ranges of the cells 2 and 3. Each of the cells 2 and 3 comprises cell equipment 8 and 9, respectively, that demodulates and decodes information received by antenna 11 and antenna 12, respectively, and provides the demodulated and decoded information to the home MSC 7. In the opposite direction, the cell equipment 8 and 9 receive information from the home MSC 7 that it encodes, modulates and transmits via the antennas 11 and 12 over the cells 2 and 3, respectively.

Figure 1B:
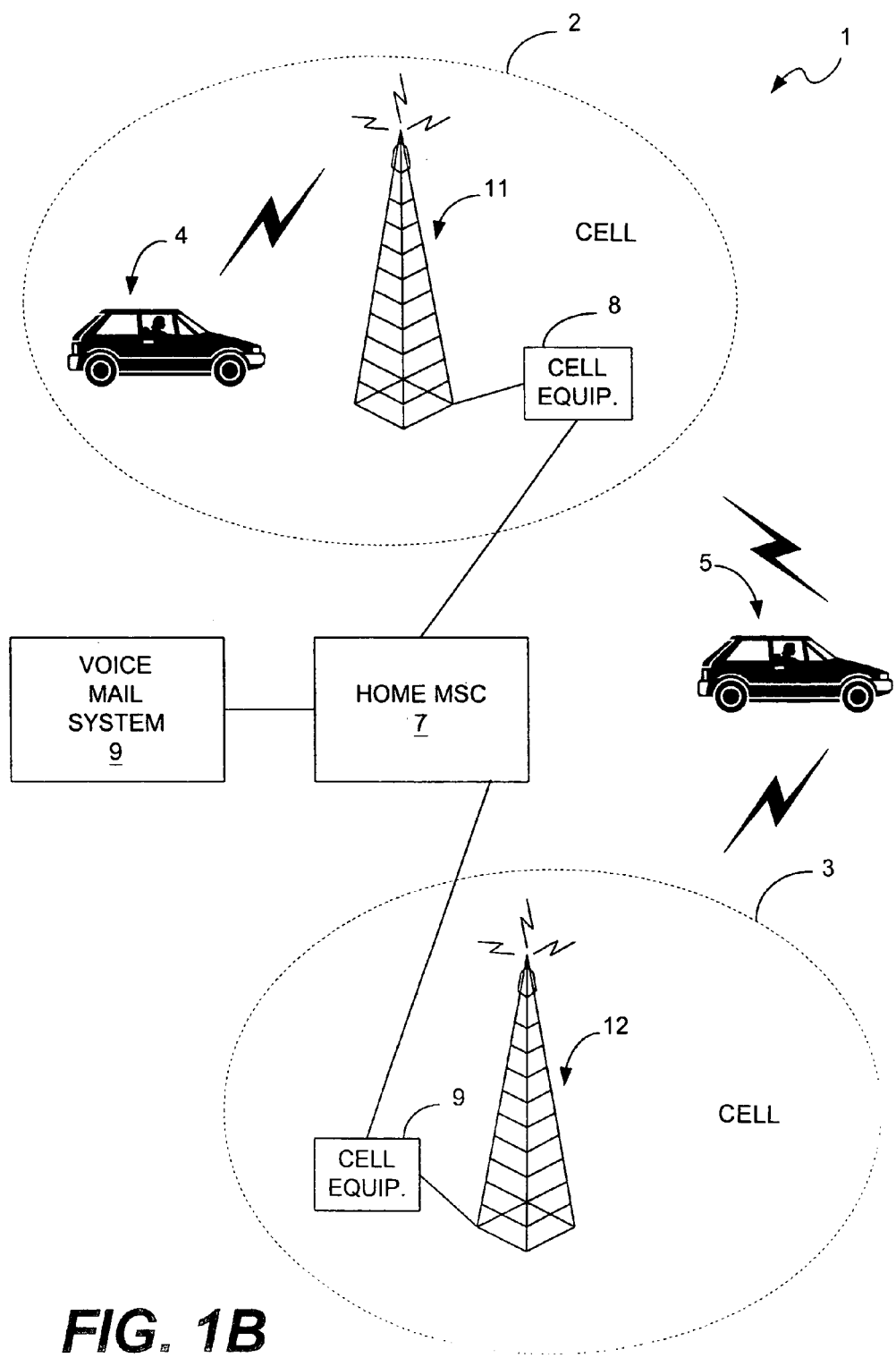
FIG. 1B illustrates the wireless network of FIG. 1, but one the mobile device users has traveled out of range of the cell and thus is no longer in communication with the network (i.e., the mobile device user has been dropped).

In the situation shown in FIG. 1A, both of the users are mobile device users and both are within the ranges of their respective cells. It is assumed that no physical barrier exists that would prevent one of the mobile device users from receiving the signal from its respective cell, and that the call between the mobile device users is not dropped. In contrast, FIG. 1B is a diagram illustrating a situation in which both mobile device users 4 and 5 also are served by the same home MSC 7, but mobile device user 5 has moved out of range of any cell of the wireless network 1. Therefore, mobile device user 5 has been dropped from the call and is no longer in communication with the cellular network 1. However, mobile device user 4 remains in communication with the network because mobile device user 4 is within the range of the cell 2 and has not terminated the call.

In the situation illustrated by FIG. 1B, the MSC 7 knows that the mobile user 5 has been dropped because the mobile device user 5 did not send a call termination signal (i.e., the mobile device user did not hang up) and yet is no longer in communication with the network 1. Also, the MSC 7 knows that the mobile device user 5 is not roaming because if the mobile device user 5 had crossed another cell boundary, the HLR registry (not shown) of the home MSC 7 would have been updated with a corresponding indication. The home MSC 7 HLR registry is also updated when a mobile device user is in an area that is served by a different MSC.

Because the home MSC 7 knows that mobile device user 5 has been dropped and because mobile device user 4 remains in communication with the wireless network 1, the MSC 7 will cause the mobile device user 4 to be connected to a voice mail system 9 associated with mobile device user 5 that will allow the mobile device user 4 to leave a message for the mobile device user 5. Therefore, in accordance with this example embodiment, the voice message processing circuitry that performs the tasks of determining when a mobile device user has been dropped and of switching the non-dropped party to the dropped party's voice mail is located at the MSC 7. However, it should be noted that the voice message processing circuitry of the present invention could be located at virtually any other location that is either within the network 1 or that is able to communicate with the network 1. For example, the voice message processing circuitry of the present invention could be located at a cell site, or base station, of the network, such as in cell equipment 9, or at a base station controller of the network that serves a plurality of cells and provides an interface between the cells and an MSC. Alternatively, the voice message processing circuitry could be located at an authentication center of a wireless network.

Furthermore, the voice message processing circuitry could be located in part at any one or of these or other locations in communication with the network and in part at any one of these or other locations in communication with the network. However, for purposes of describing the fundamental concepts and features of the present invention, the present invention will be described herein as if the voice message processing circuitry is installed at a single MSC. However, those skilled in the art will understand in view of the discussion provided herein an MSC is merely one of many possible locations at which an the voice mail processing circuitry of the present invention could be installed.

Also, there are many ways in which the non-dropped party can be routed to a voice mail system that serves the dropped party, as will be understood by those skilled in the art in view of the discussion provided herein. It should be noted that the present invention is not limited to any particular technique for performing this function. A few example embodiments demonstrating the manner in which this function can be accomplished will be discussed below with reference to FIGS. 4 and 5.

Figure 2:
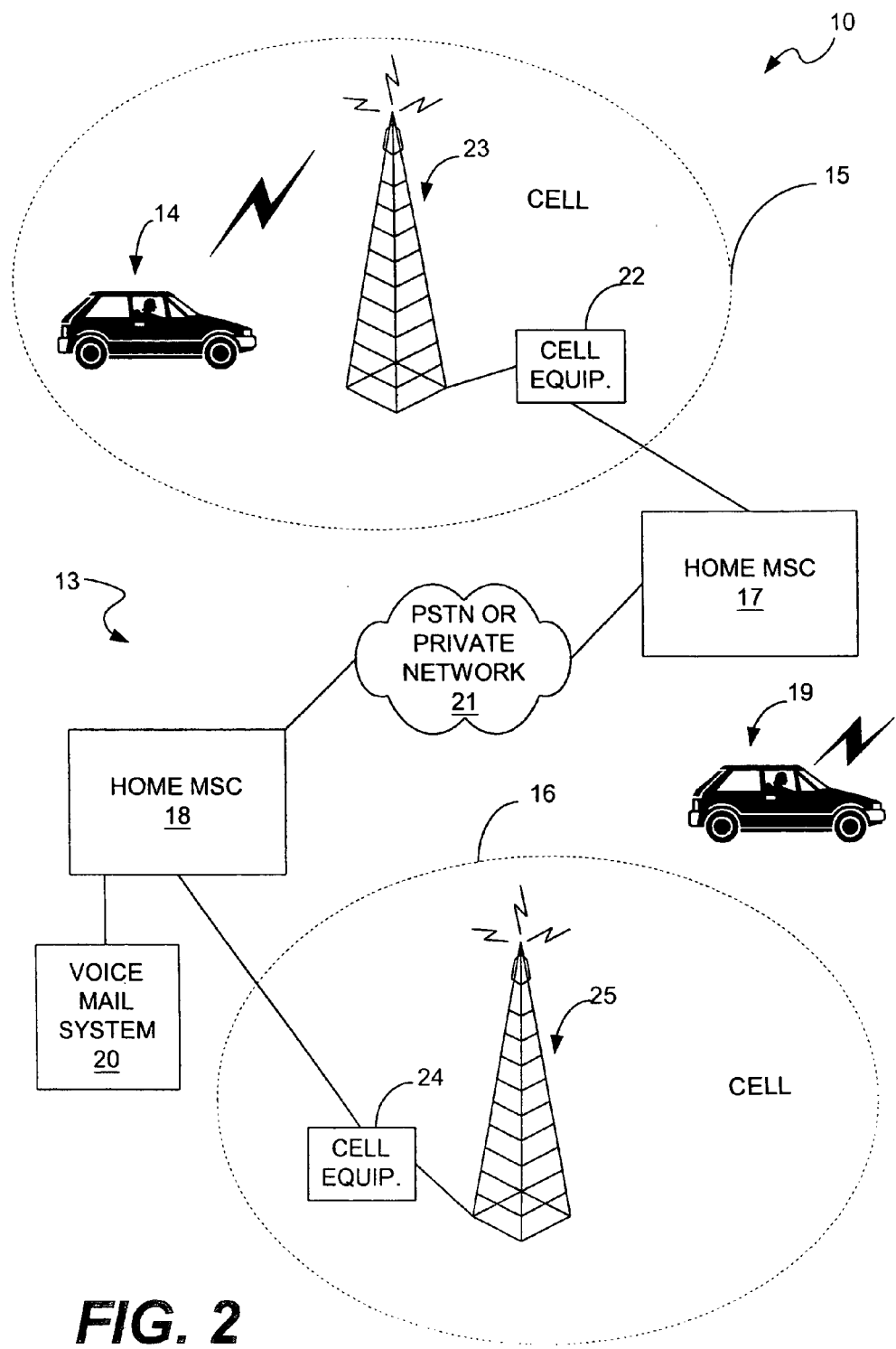
FIG. 2 illustrates two wireless networks wherein one cell of one network is supported by an MSC of that network, and a cell of the other network is supported by an MSC of that network, which is in communication with a voice mail system of a mobile device user who has moved out of range of a cell.

FIG. 2 illustrates an example of another situation in which the present invention can be applied. In accordance with this example, two different wireless networks 10 and 13 are in communication with each other, and a call has been setup between the mobile device user 14 in cell 15 of network 10 and mobile device user 19 in cell 16 of network 13. The MSCs 17 and 18 of the wireless networks 10 and 13, respectively, are in communication with each other via the Public Switched Telephone Network (PSTN) or a private network, which are represented by a network cloud 21. The wireless network 10 comprises the MSC 17 and the cell 15, which comprises cell equipment 22 and antenna 23. The wireless network 13 comprises the MSC 18 and the cell 16, which comprises cell equipment 24 and antenna 25.

In this example, one mobile device user 14 is being served by the home MSC 17 and another mobile device user 19 is being served by the home MSC 18. The mobile device user 19 has moved out of range of the cell 16 and is not within range of any other cell. Therefore, the mobile device user 19 has been dropped from the call. However, because the mobile device user 14 has not sent a call termination signal, mobile device user 14 remains in communication with the network 10, which remains in communication with the network 13. Using information about the mobile device user 19, which is delivered to the MSC 18 from the MSC 17, the MSC 18 connects the mobile device user 14 with the voice mail system 20 of the dropped party 19 to enable mobile device user 14 to leave a voice message for the dropped party 19. Thus, the present invention can be applied across different networks through a communication link between the MSCs of the different networks.

Figure 3:
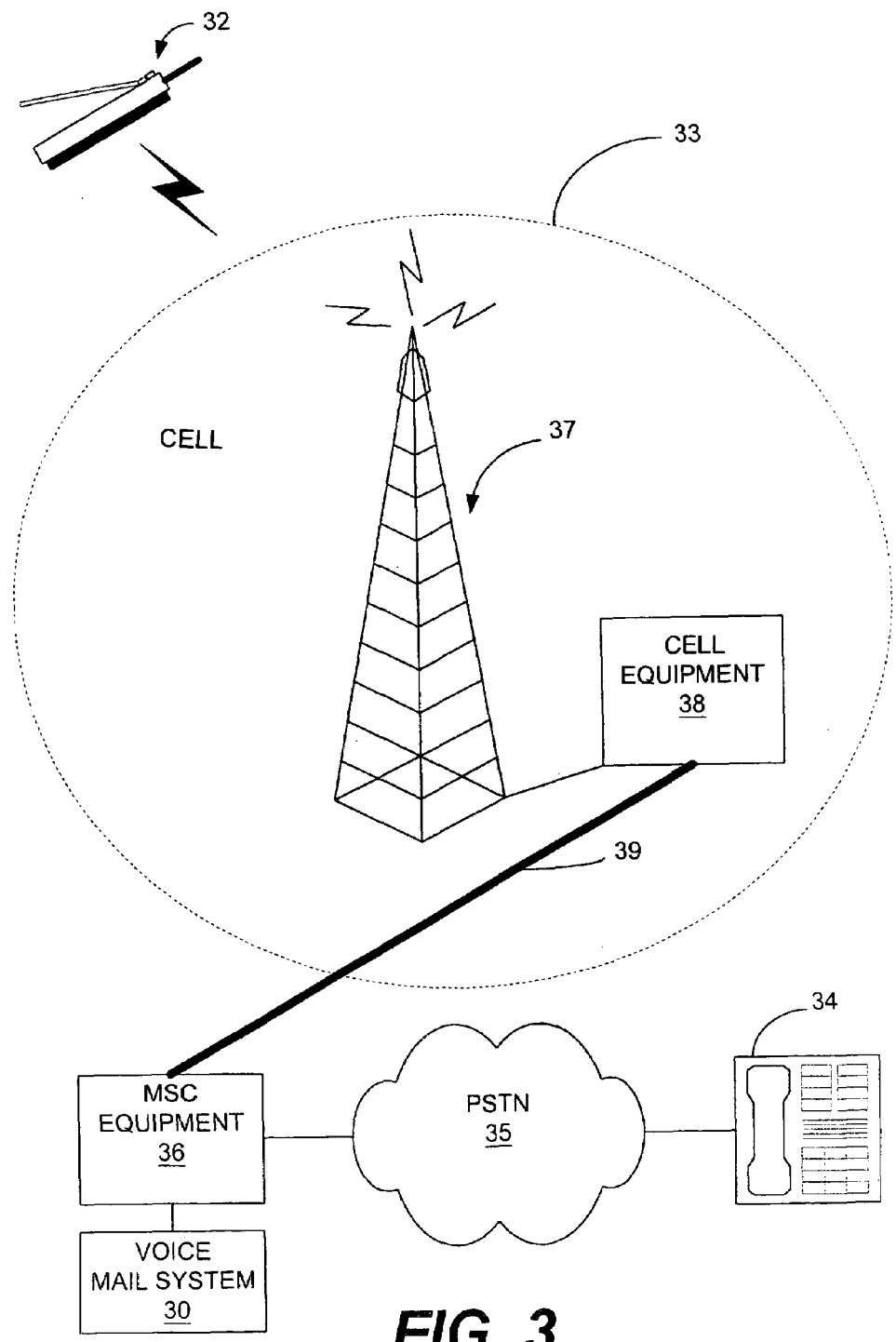
FIG. 3 illustrates a wireless network having an MSC that interfaces with the Public Switched Telephone Network (PSTN) to enable a party on a land line to communicate with a mobile device user and to leave a voice message for the mobile device user if the mobile device user is dropped from the call.

FIG. 3 is a diagram illustrating another example situation in which the present invention can be applied. In accordance with this example, a call has been setup between a mobile device 32 and a landline telephone 34. The landline telephone 34 is connected to the PSTN 35, which is in communication with the cell 33 of a wireless network via a communication link between the MSC 36 serving the cell 33. As in the examples above, the cell 33 comprises an antenna 37 and cell equipment 38. The cell equipment 38 is connected via a cable 39 (e.g., a T1 cable) or a wireless link (not shown) to the MSC 36.

In this example, the mobile device 32 is a wireless telephone that has moved out of range of cell 33 and thus has been dropped from the call. However, the user of telephone 34 remains in contact with the MSC 36, which is in communication with a voice mail system 30 associated with the user of the dropped mobile device 32. Therefore, when the MSC 36 determines that the mobile device 32 is no longer in communication with the network and that the mobile device 32 did not terminate the call, the MSC 36 connects telephone 34 with the voice mail system 30 to enable the user of telephone 34 to leave a voice message for the user of mobile device 32. As discussed below, it is not necessary for the voice mail system 30 to be connected to the MSC 36. The voice mail system 30 is shown as being connected to the MSC 36 merely for the purpose of demonstrating that the MSC 36 performs the function of causing the non-dropped party to be routed to the dropped party's voice mail system.

Figure 4:
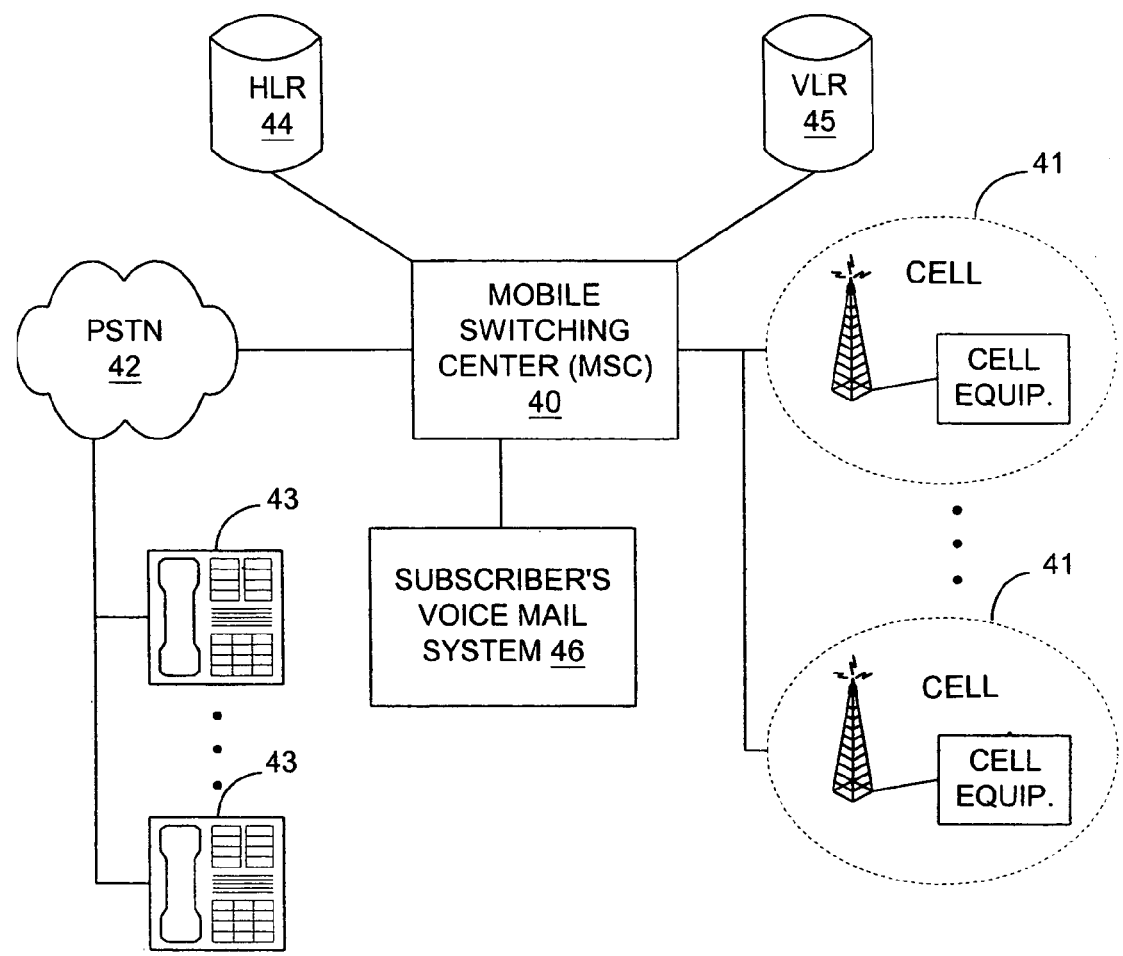
FIG. 4 is a block diagram illustrating components of a wireless network, which include an MSC that is in communication with a voice mail system of a mobile device user who has been dropped from a call.

FIG. 4 is a diagram illustrating the dropped party's MSC 40 connected to cells 41 that the MSC 40 serves and to a PSTN 42. Therefore, the MSC 40 can communicate with landline telephones 43 and mobile device users within cells 41. The MSC 40 is also connected to an HLR 44 and to a VLR 45, which serve the aforementioned functions of saving mobile device information that is accessed by the MSC 40 for various purposes, such as for locating a mobile device in order to route a call to it. The MSC 40 is also in communication with a voice mail system 46 that stores voice mail messages for users of wireless networks that are in communication with the MSC 40. The HLR database 44 or some other database (not shown) accessible by the MSC 40 contains information that the MSC 40 uses to route the caller who was not dropped to the dropped caller's voice mail system 46.

Although the dropped party's voice mail system 46 is shown as being connected directly to the home MSC 40, the voice mail system can be anywhere in the wireless network or in another network in communication with the MSC 40, such as, for example, in the PSTN network 42. The MSC 40 simply routes the call to the destination designated by the information stored at the MSC 40, either in the HLR user profile, the VLR database 45 or in some other database. The voice mail system 46 preferably will then perform the same functions that are typically performed when a mobile device user is on another call or when the mobile device is inactive (e.g., turned off or out of power), such as prompting the caller to leave a message and storing the message in a database associated with the subscriber of the voice mail system 46. Alternatively, the MSC 40 could route the non-dropped party to another destination, such as an answering machine connected to a telephone line of the PSTN 42.

Many wireless network voice mail systems that are currently implemented provide the mobile device user with a notification when a message has been left for the mobile device user. In accordance with the present invention, such a notification preferably would be provided to the mobile device user. An indication of the telephone number and/or identification of the party that left the message may also be provided to the mobile device user, depending on the technology employed by the voice mail system. Those skilled in the art will recognize that such features are currently available through signaling system 7 (SS7) technology and could be integrated with the overall concepts of the present invention.

Figure 5:
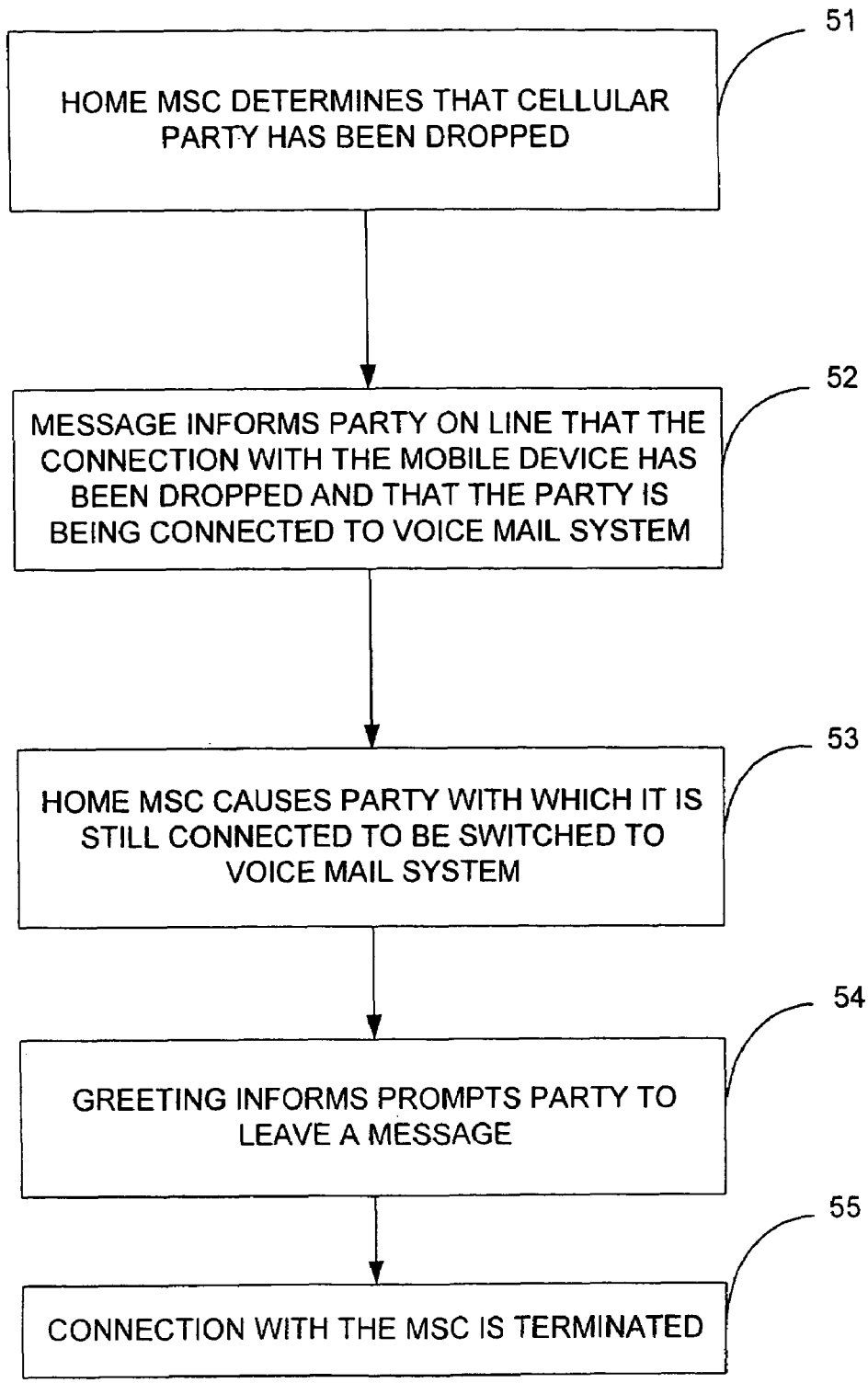
FIG. 5 is a flow chart that demonstrates an example embodiment of the method of the present invention.

FIG. 5 is a flow chart illustrating an example embodiment of the method of the present invention. As stated above, when a mobile device user has been dropped, the home MSC of the mobile device user is aware that the call has been dropped as opposed to a release initiated by the mobile device user. Therefore, the home MSC determines that the mobile device user has been dropped, as indicated by block 51. If the user is dropped when the user is being served by an out-of-area MSC, the out-of-area MSC will inform the home MSC of the dropped call. Therefore, in either case, the home MSC will know that the call was dropped. Preferably, the non-dropped party will then be informed that the call was dropped and that they are being switched to the dropped party's voice mail, as indicated by block 52. This step is optional. The home MSC will then cause the non-dropped party to be connected to the dropped party's voice mail, as indicated by block 53. The party could simply be switched to the dropped party's voice mail system and receive the dropped party's normal greeting.

Once the call has been switched, the dropped party's voice mail system plays the dropped party's greeting and the non-dropped party will be given the opportunity to leave a message, as indicated by block 54. When the non-dropped party terminates the call, the connection with the MSC will be terminated and the resources allocated to the call by the MSC will be released, as indicated by block 55.

It should be noted that the present invention has been described with respect to particular embodiments that are only example embodiments that demonstrate the manner in which the present invention can be applied. Those skilled in the art will understand in view of the discussion provided herein that additional features and modifications may be made to the embodiments described herein that are within the scope of the present invention. It should also be noted that the present invention is applicable to all types of wireless networks, including personal communications services (PCS) wireless networks (1,850-1990 megahertz (MHz) frequency bands), cellular wireless networks (806-902 MHz frequency bands), global systems for mobile communications (GSM) wireless networks, time division multiple access (TDMA) wireless networks, code division multiple access (CDMA) wireless networks, advanced mobile phone service (AMPS) wireless networks and universal mobile telecommunications systems (UTMS) wireless networks. Also, as will be understood by those skilled in the art in view of the present disclosure, the present invention is not limited to any particular set of frequencies or frequency ranges.

What is claimed is:

1. An apparatus that enables one mobile device to leave a voice mail for another mobile device user in the event that communication between said mobile devices is dropped during a call, the apparatus comprising:
   voice message processing circuitry in communication with cell equipment of at least one cell of a wireless network, the voice message processing circuitry configured to:
   determine if the communication between said mobile devices has been dropped during a call between the mobile devices;
   determine which of the mobile devices has been dropped in response to determining that the communication between the mobile devices has been dropped; and
   route the call from the mobile device that was not dropped to a voice mail associated with the mobile device that was dropped in response to determining which of the mobile devices has been dropped.

2. The apparatus of claim 1, wherein the voice message processing circuitry is comprised at a mobile switching center (MSC) of the wireless network, the MSC being in communication with said at least one cell of a wireless network.

3. The apparatus of claim 2, wherein when the communication associated with the call is dropped, the MSC causes the mobile device that was not dropped to be notified that the call has been dropped and that the mobile device that was not dropped is being connected to the voice mail system associated with said dropped mobile device user so that the mobile device that was not dropped can leave a voice message for said mobile device user.

4. The apparatus of claim 1, wherein when the communication associated with the call is dropped, and after the mobile device that was not dropped leaves a voice message for said dropped mobile device user, the voice message processing circuitry causes a signal to be transmitted to the cell equipment, which transmits a notification intended for said dropped mobile device user to inform said dropped mobile device user that the mobile device that was not dropped has left a message for said dropped mobile device user to which said connection has been dropped form the call.

5. A wireless network that enables a telephony device of a party in communication with a mobile device of a mobile device user to leave a voice mail for said mobile device user in the event that the communication with said mobile device is dropped during a call between said party and said mobile device user, the wireless network comprising:
   at least a first mobile switching center (MSC);
   cell equipment of at least a first cell of a first wireless network, the cell equipment of the first cell being in communication with the MSC; and
   voice message processing circuitry in communication with cell equipment of at least one cell of a wireless network, the voice message processing circuitry configured to:
   determine if the communication between said party and said mobile device user has been dropped during a call between said party and said mobile device user;
   determine that the mobile device has been dropped in response to determining that the communication between the party and the mobile device user has been dropped; and
   route the call from the telephony device to a voice mail associated with the mobile device that was dropped in response to determining that the communication between the party and the mobile device user has been dropped.

6. The wireless network of claim 5, further comprising:
   at least a second mobile switching center (MSC); and
   cell equipment of at least a second cell of a second wireless network, the cell equipment of said second cell being in communication with the second MSC, the second MSC being in communication with the first MSC, the voice message processing circuitry being comprised at the second MSC, wherein the first MSC informs the second MSC of the dropped call in response to determining that the call has been dropped and the second MSC automatically causes the telephony device to be connected to a voice mail system associated with the dropped mobile device so that the telephony device can leave a voice mail message for said dropped mobile device.

7. The wireless network of claim 5, wherein the voice message processing circuitry is comprised at said cell equipment of said at least a first cell.

8. The wireless network of claim 5, wherein when the communication associated with the call is dropped, the first MSC causes the telephony device to be notified that the call has been dropped and that the telephony device is being switched to the voice mail system of said dropped mobile device user so that the telephony device can leave a voice message for said dropped mobile device.

9. The wireless network of claim 5, wherein when the communication associated with the call is dropped, and after the telephony device leaves a voice message for said dropped mobile device, the first MSC causes a signal to be transmitted to the cell equipment of the first cell, which transmits a notification intended for said dropped mobile device to inform said dropped mobile device that the telephony device has left a message for said dropped mobile device.

\* \* \* \* \*